UNITED STATES PATENT OFFICE.

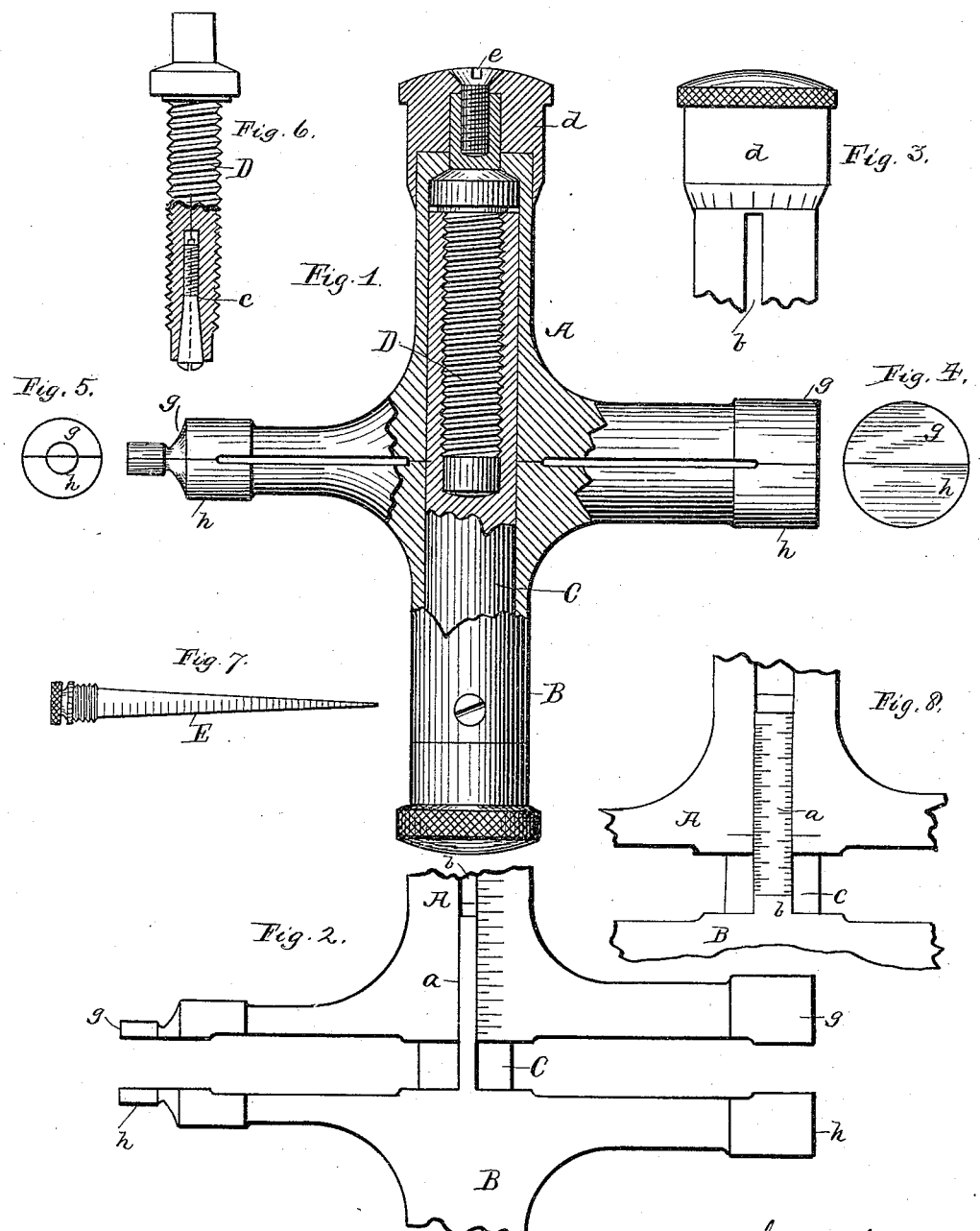

SIMON H. STUPAKOFF, OF PITTSBURG, PENNSYLVANIA.

MICROMETER-GAGE.

SPECIFICATION forming part of Letters Patent No. 438,504, dated October 14, 1890.

Application filed September 12, 1889. Serial No. 323,785. (No model.)

*To all whom it may concern:*

Be it known that I, SIMON H. STUPAKOFF, a citizen of the United States, residing at Pittsburg, in the county of Allegheny and State of Pennsylvania, have invented certain new and useful Improvements in Micrometer Gage-Screws; and I do hereby declare the following to be a full, clear, and exact description of the invention, such as will enable others skilled in the art to which it pertains to make and use the same, reference being had to the accompanying drawings, which form a part of this specification, in which—

Figure 1 is an elevation, partly in section, of my improved micrometer-screw gage. Fig. 2 is a longitudinal elevation of transverse or measurement arms, the sections of same being separated. Figs. 3, 4, and 5 are respectively elevation of thumb-cap and plan of either end of measurement-arms. Fig. 6 is a vertical elevation, partly in section, of micrometer-screw, the lower end thereof split for the reception of an expansion pin or screw. Fig. 7 is an elevation of the tapering gage for exceedingly small diameters. Fig. 8 is an enlarged view of part of the movable section of gage, showing scale on spline.

The object of my invention is to produce a micrometer-screw gage by which outside and inside diameters and the difference in dimensions of two or more diameters can be measured with the utmost exactness. This I believe I have accomplished by the device hereinafter more specifically described, which is substantially cruciform in shape and divided into two sections through its transverse or measurement arms in the direction of their length, the undivided arm of one section being hollow and adapted to slide back and forward upon a hollow cylindrical extension of the other section projecting therein and connecting both sections. A micrometer-screw operating in said extension projecting in the undivided arm of the movable section is adapted to move said section from and toward the other or stationary sections, whereby the ends of the divided transverse measurement-arms are separated and brought in close contact, enabling the accurate measurement of outside diameters placed between them and inside diameters of pipe or cylinders into which they may be thrust.

I will now more specifically describe my invention, reference being had to the accompanying drawings, in which—

A and B are the undivided arms of the movable and stationary sections, respectively, the undivided arm of the movable section being hollow for the reception of the hollow cylindrical extension C, forming part of the stationary section, and upon which said movable section is adapted to move from and toward the stationary section by the movement of the micrometer-screw D, operating in said hollow extension, which is provided with an internal thread for that purpose. In the drawings said cylindrical extension is shown as a separate piece rigidly secured in an orifice drilled in the undivided arm of the stationary section by a screw, but is preferably formed as part of said section, as described. The movable section is prevented from turning or rotating on said extension by the spline or splines $a$ on either side of said extension, which engage and operate in the slots $b$ of corresponding length formed in the undivided arm of the movable section of said gage. The lower end of said micrometer-screw is split, as shown in Fig. 6, and is provided with a thread in the interior of said split for the reception of small expansion screw pin or stem $c$, which is adapted to distend the lower end of said screw for the purpose of taking up slack motion caused by wear, and its upper end is provided with a thumb-cap $d$, which is secured thereon by the screw $e$ or other suitable means. The upper periphery of said cap is knurled or milled for the purpose of more easily rotating the same, and upon its lower flange is marked twenty-five or other desirable number of graduative spaces. By turning said cap one of said spaces the micrometer-screw, which is provided with forty graduative threads to the inch, moves the outer ends or tips $g\ g$ of the movable section of the transverse measurement-arms from or toward the ends or tips $h\ h$ of the stationary section of said arms relatively the one thousandth of an inch, whereby inside diameters may be exactly measured by adding to the distance indicated on the scale (on either side, respectively, of said splines or on the undivided arm of the movable section of the gage) the known diameter of the end of the measurement-arm thrust in an orifice the diameter of which may be required, the diameters of said tips being preferably even multiples of thousandths to admit of ready and speedy additions, and outside diameters of objects held between the jaws of said measurement-arms are indicated on the scale in the usual way.

The undivided arm B of the stationary section heretofore described as solid is preferably provided with a tapering orifice extending in the direction of its length for the reception of the tapering pin E, (a view of which is shown in Fig. 7,) provided with a graduated scale of diameters, the largest of which is somewhat smaller than the diameter of the smallest end of the measurement-arms, running down to infinitely small or needle-point diameter for the purpose of measuring inside diameters of the very smallest dimensions.

The advantages of my gage will be appreciated by those skilled in the art to which it pertains. Its simplicity of construction and peculiarity of form, which permit the exact measurement of both inside and outside diameters without the least inconvenience, are some of its many advantages.

It is obvious that the form of the device so far as the relative position of the movable and stationary sections of the measurement-arms may be changed without departing from my invention, I therefore do not confine myself to the form of the device specifically shown; but What I do claim, and desire to secure by Letters Patent, is—

1. A micrometer-screw gage consisting of two sections, which are divided through measurement-arms that project at right angles to a micrometer-screw, a socket in the undivided arm of one member, and a micrometer-screw within the undivided arm of the other member and fitted within the socket, whereby the micrometer-screw is completely housed within the section of the micrometer, and means rigid with the screw for operating the same, substantially as described, for the purpose set forth.

2. A micrometer-screw gage for measuring both internal and external diameters, consisting of a movable and a stationary section, having the measuring-arms and a micrometer-screw secured within the movable section and engaging with an internally-threaded hollow extension of the stationary section, as and for the purpose described.

3. A micrometer-screw gage consisting of a movable and a stationary section having the divided and undivided arms, one of which sections has within its undivided arm a micrometer-screw, and a wedge c, fitted within the micrometer-screw for expanding the same, said screw engaging with an internally-threaded hollow extension of the undivided arm of the other section, substantially as described.

4. In a micrometer-screw gage formed in two sections, substantially as described, the combination of a movable section, the undivided arm of which is hollow and provided with slots on either side running the direction of its length, a stationary section having a hollow cylindrical extension internally threaded and provided with one or more splines on either side thereof, upon which is marked a graduative scale of measurements, said extension projecting in the hollow undivided arm of said movable section and connecting both said sections, and a graduated micrometer-screw operating in said extension and provided with a thumb cap or nut, the lower flange of which is provided with a graduated scale, substantially as and for the purpose set forth.

5 A micrometer-screw gage consisting of the stationary section having an internally-threaded extension, a movable section keyed to the stationary section, said stationary and movable sections having the divided measurement-arms extending at right angles to the undivided arms thereof, a micrometer-screw inclosed within the undivided arm of the movable section and fitted within the threaded extension of the stationary section, and a rotatable external cap rigid with the micrometer-screw, as and for the purpose set forth.

In testimony that I claim the foregoing I hereunto affix my signature this 31st day of August, A. D. 1889.

SIMON H. STUPAKOFF. [L. S.]

In presence of—
    C. C. LEE,
    CHAUNCEY B. BOSTWICK.